(12) United States Patent  (10) Patent No.: US 8,056,410 B2
Sanchez et al.  (45) Date of Patent: Nov. 15, 2011

(54) METHOD FOR PREDICTING IMBALANCE OF A PROPELLER SHAFT ASSEMBLY

(75) Inventors: Victor S. Sanchez, Sterling Heights, MI (US); James P. Borowiak, Grand Blanc, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 366 days.

(21) Appl. No.: 12/469,960

(22) Filed: May 21, 2009

(65) Prior Publication Data

US 2010/0294038 A1  Nov. 25, 2010

(51) Int. Cl.
 *G01M 1/00* (2006.01)
(52) U.S. Cl. .................. 73/455; 73/66; 73/457; 73/460
(58) Field of Classification Search .................... 73/455, 73/460, 457
See application file for complete search history.

(56) References Cited

U.S. PATENT DOCUMENTS

| | | | |
|---|---|---|---|
| 4,608,650 A | | 8/1986 | Kapadia |
| 4,724,708 A | * | 2/1988 | Okano et al. ............ 73/460 |
| 5,046,361 A | | 9/1991 | Sandstrom |
| 5,230,246 A | | 7/1993 | Oetiker |
| 5,419,192 A | | 5/1995 | Maxwell et al. |
| 5,431,049 A | | 7/1995 | Kopp |
| 5,484,264 A | * | 1/1996 | Karls et al. ............ 416/204 R |
| 5,722,896 A | * | 3/1998 | Beagley et al. ............ 464/180 |
| 5,760,302 A | | 6/1998 | Moradi et al. |
| 5,877,420 A | | 3/1999 | Moradi et al. |
| 5,922,952 A | | 7/1999 | Moradi et al. |
| 6,123,623 A | * | 9/2000 | Sugiyama ............ 464/180 |
| 6,523,407 B1 | | 2/2003 | Breese |
| 6,655,208 B1 | | 12/2003 | McClanahan |
| 6,752,722 B2 | | 6/2004 | Armitage et al. |
| 6,792,660 B1 | | 9/2004 | Breese |
| 6,802,206 B2 | | 10/2004 | Kurecka et al. |
| 6,865,466 B2 | | 3/2005 | Voight et al. |
| 6,874,228 B2 | | 4/2005 | Armitage et al. |
| 6,889,803 B2 | | 5/2005 | Schankin et al. |
| 6,907,774 B2 | | 6/2005 | Kurecka et al. |
| 6,923,058 B2 | | 8/2005 | Nieman et al. |
| 6,966,839 B2 | | 11/2005 | Tomonelli |
| 6,969,334 B2 | | 11/2005 | Schleuder et al. |
| 7,004,291 B2 | | 2/2006 | Schankin et al. |
| 7,066,025 B1 | * | 6/2006 | Corbin ............ 73/462 |
| 7,347,785 B2 | | 3/2008 | Worman, Jr. et al. |
| 7,424,337 B2 | | 9/2008 | Schäfers et al. |
| 7,441,456 B1 | | 10/2008 | Corbin et al. |
| 7,533,756 B2 | | 5/2009 | Patrascu et al. |
| 2003/0074151 A1 | | 4/2003 | Rapp |
| 2003/0154785 A1 | | 8/2003 | Calkins et al. |
| 2004/0059288 A1 | * | 3/2004 | Webler et al. ............ 604/95.04 |
| 2004/0162148 A1 | | 8/2004 | Krugman et al. |
| 2004/0180726 A1 | | 9/2004 | Freeman et al. |
| 2005/0210976 A1 | | 9/2005 | Gerdes et al. |
| 2008/0132342 A1 | | 6/2008 | Worman et al. |

* cited by examiner

*Primary Examiner* — Max Noori
(74) *Attorney, Agent, or Firm* — Harness, Dickey & Pierce, P.L.C.

(57) ABSTRACT

A method for determining an imbalance of a propeller shaft assembly can include establishing balancing planes relative to certain areas of the propeller shaft assembly and identifying each component of the propeller shaft assembly that could have a potential imbalance condition due to a tolerance variation. The method can also include determining the potential imbalance condition for each identified component, and determining a contribution of each determined potential imbalance condition to a respective pair of the established balancing planes. The method can further include determining a total magnitude of imbalance at the respective pair of established balancing planes based on the determined contributions of each potential imbalance condition, and determining a statistically representative value of the determined magnitude of imbalance.

19 Claims, 3 Drawing Sheets

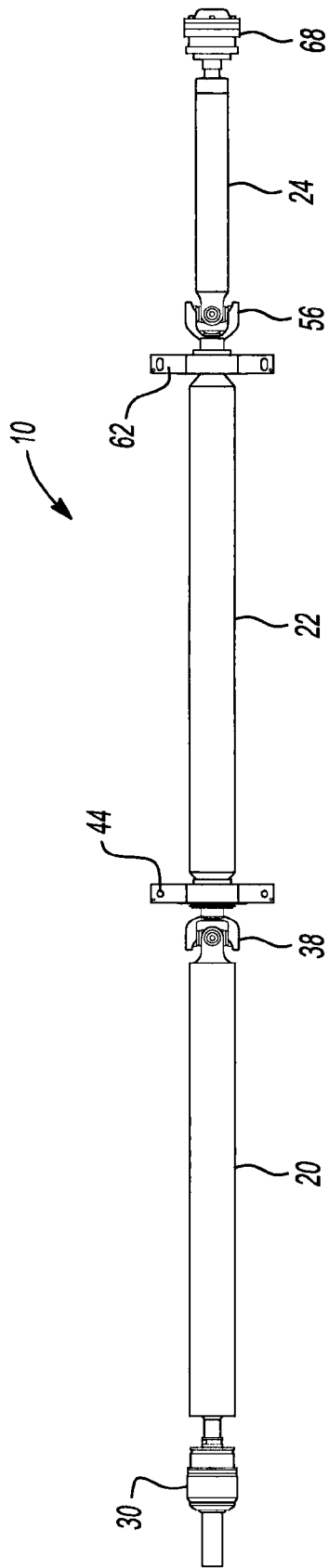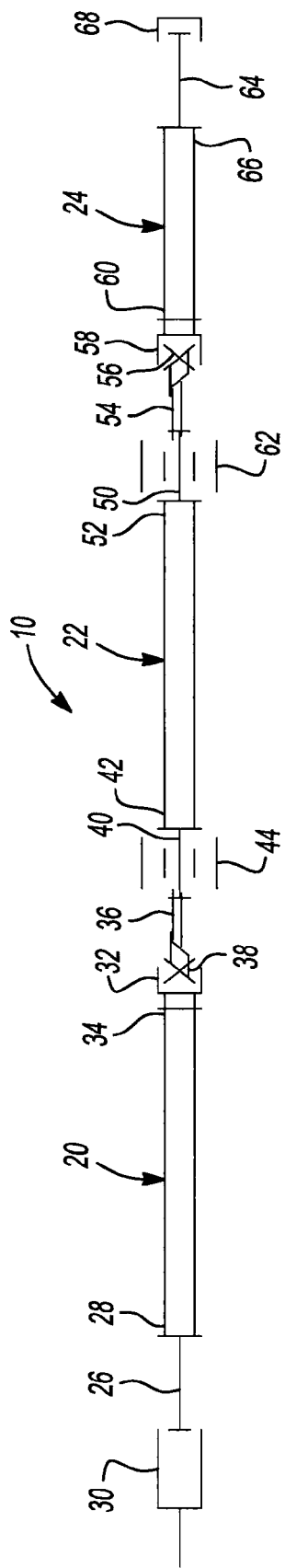

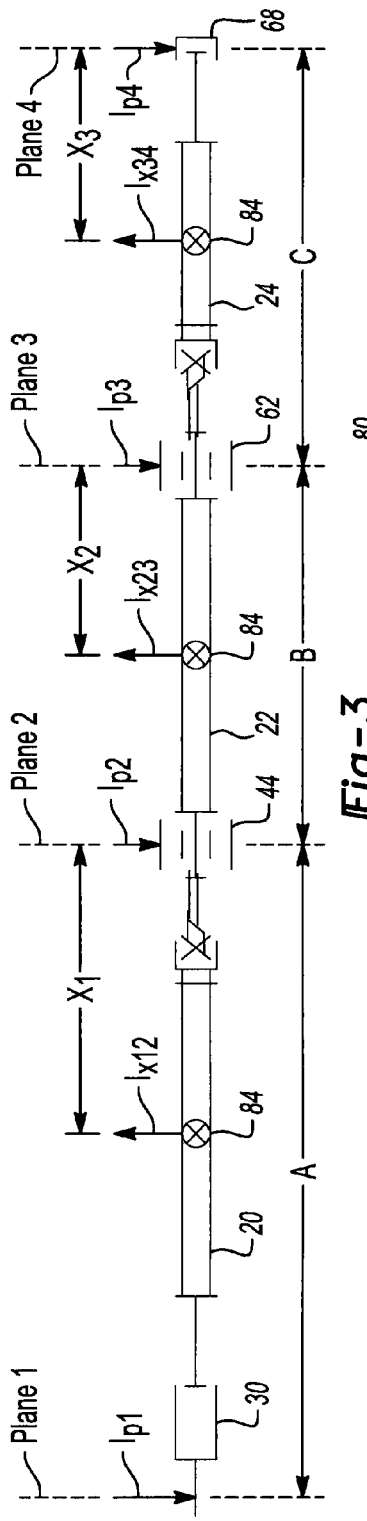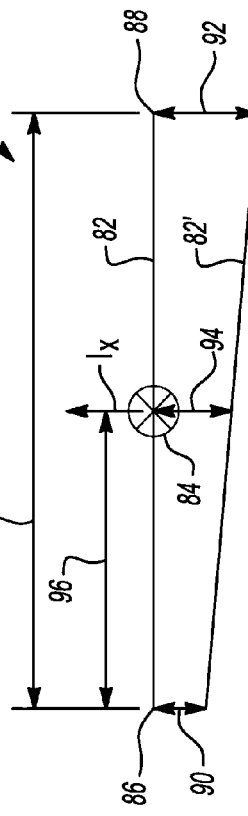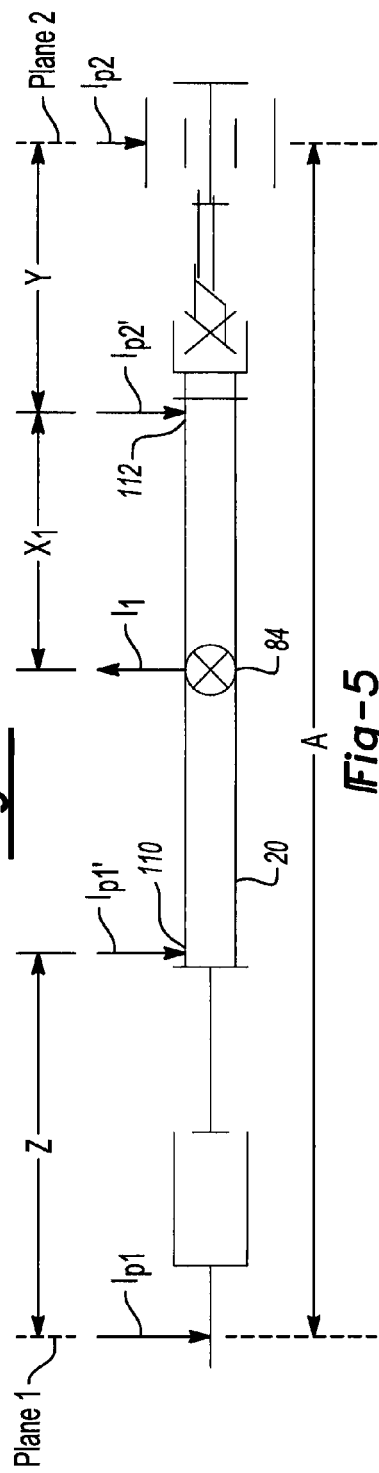
Fig-3
Fig-4
Fig-5

METHOD FOR PREDICTING IMBALANCE OF A PROPELLER SHAFT ASSEMBLY

FIELD

The present disclosure generally relates to a method for determining an imbalance of a propeller shaft assembly.

BACKGROUND

In the manufacture of modern vehicle propeller shaft assemblies, it is common practice to include a balancing process to identify and counteract an unbalanced condition of an assembled propeller shaft. A typical balancing process utilizes a balancing machine often included as one of the final operations in the overall manufacturing process of the propeller shaft assembly. The balancing machine will typically rotate the propeller shaft assembly at a predetermined speed and sense vibrations that can be caused by an unbalanced propeller shaft structure. The balancing machine can then identify where one or more balancing weights may need to be positioned on the propeller shaft assembly to counteract the vibrations caused by the unbalanced structure. In some instances, the vibrations sensed during the balancing process are of such a magnitude that they are not able to be counteracted with the balancing weights and the propeller shaft assembly then has to be re-worked or scrapped. Although such a balancing process is effective, it suffers from several drawbacks, including being a reactive process requiring the propeller shaft assembly to be fully built before the balancing process can be performed.

Accordingly, there remains a need in the art for a methodology to determine an imbalance condition of a propeller shaft assembly that overcomes the aforementioned and other drawbacks.

SUMMARY

This section provides a general summary of some aspects of the present disclosure, and is not a comprehensive listing or detailing of either the full scope of the disclosure or all of the features described therein.

A method for determining an imbalance of a propeller shaft assembly is provided. The method can include establishing balancing planes relative to certain areas of the propeller shaft assembly and identifying each component of the propeller shaft assembly that could have a potential imbalance condition due to a tolerance variation. The method can also include determining the potential imbalance condition for each identified component, and determining a contribution of each potential imbalance condition to a respective pair of the established balancing planes. The method can further include determining a total magnitude of imbalance at the respective pair of established balancing planes based on the determined contributions of each determined potential imbalance condition, and determining a statistically representative value of the determined total magnitude of imbalance at the respective pair of balancing planes.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

FIG. 1 is top view of an exemplary propeller shaft assembly according to the principles of the present disclosure;

FIG. 2 is schematic view of the exemplary propeller shaft assembly of FIG. 1 according to the principles of the present disclosure;

FIG. 3 is a diagrammatic view of the exemplary propeller shaft assembly of FIG. 2 illustrating a method of determining an imbalance of the propeller shaft assembly according to the principles of the present disclosure;

FIG. 4 is an exemplary free body diagram illustrating a method of determining an imbalance of the propeller shaft assembly according to the principles of the present disclosure;

FIG. 5 is a partial diagrammatic view of the exemplary propeller shaft assembly of FIG. 2 illustrating a method of determining an imbalance of the propeller shaft assembly according to the principles of the present disclosure.

Corresponding reference numerals indicate corresponding parts throughout the several views of the drawings.

DETAILED DESCRIPTION

Figure 6:
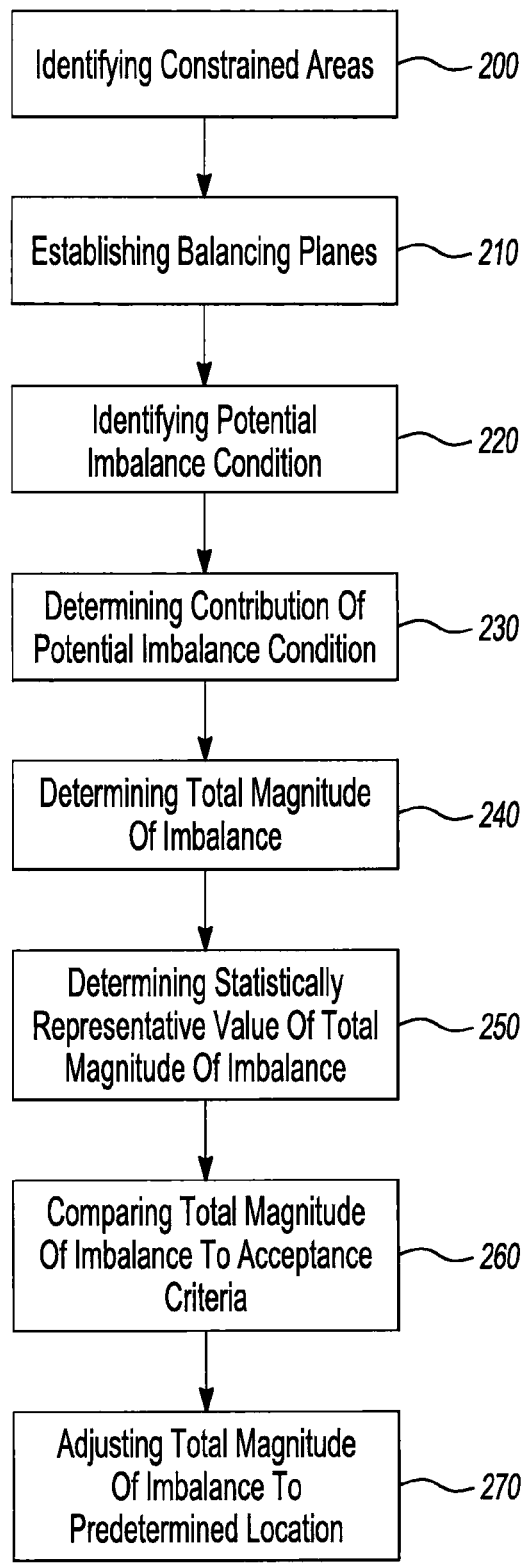
FIG. 6 is flowchart illustrating a method of determining an imbalance of the propeller shaft assembly according to the principles of the present disclosure.

Referring now to the drawings, an exemplary propeller shaft assembly 10 is shown in FIGS. 1 and 2. Propeller shaft assembly 10 can include a front tube 20, a center tube 22, and a rear tube 24. A stub shaft 26 can be fixed to a first end 28 of front tube 20 in a conventional manner, such as by welding, and stub shaft 26 can be coupled to a constant velocity joint 30 that is adapted to be coupled to a power transmission device (not shown). A weld yoke 32 can be fixed to a second end 34 of front tube 20 in a conventional manner, such as by welding, and can be coupled to a spline yoke 36 of a universal joint assembly 38. A stub shaft 40 can be fixed at one end to a first end 42 of center tube 22 and coupled at another end to spline yoke 36. A front support bearing assembly 44 can be rotatably coupled to stub shaft 40 and can be adapted to be attached to a vehicle structure (not shown) to provide rotational support to propeller shaft assembly 10.

A stub shaft 50 can be fixed, such as by welding, to a second end 52 of center tube 22 at one end and coupled at another end to a spline yoke 54 of a universal joint assembly 56. Universal joint assembly 56 can also include a weld yoke 58 coupled to a first end 60 of rear tube 24. A center bearing assembly 62 can be rotatably coupled to stub shaft 50 and can be adapted to be attached to the vehicle structure to rotatably support propeller shaft assembly 10. A stub shaft 64 can be fixed to a second end 66 of rear tube 24 at one end and coupled to a rear constant velocity joint 68 at another end. Constant velocity joint 68 can be a disk style constant velocity joint adapted for attachment to an axle assembly (not shown). It should be appreciated that while propeller shaft assembly 10 has been described as detailed above, propeller shaft assembly 10 can be configured in various arrangements including, but not limited to, a single or double tube arrangement, as may required by vehicle packaging and operational requirements.

With additional reference to FIGS. 3-6, a method for predicting an imbalance of a propeller shaft assembly will now be described according to the principles of the present disclosure with reference to exemplary propeller shaft assembly 10. The method can include identifying the points or areas on propeller shaft assembly 10 that can be attached or constrained to a vehicle frame or other structure at step 200. For example, propeller shaft assembly 10 can be constrained at constant velocity joint 30, front support bearing assembly 44, center support bearing assembly 62, and rear constant velocity joint 68. It should be appreciated that the number and location of constrained areas of propeller shaft assembly 10 can vary based on, for example, different propeller shaft configurations and/or different attachment points.

Once the constrained areas have been identified, balancing planes can be established for modeling purposes at step 210 at each of the constrained areas as shown, for example, in FIG. 3. More specifically, Plane 1 can be established at a constrained area of constant velocity joint 30, Plane 2 can be established at a constrained area of front bearing assembly 44, Plane 3 can be established at a constrained area of center support bearing assembly 62, and Plane 4 can be established at a constrained area of rear constant velocity joint 68, as shown in FIG. 3.

Once the balancing planes are established, a potential imbalance condition can be determined for the individual components of the propeller shaft assembly 10 at step 220. With reference to FIG. 4, an exemplary free body diagram 80 is provided for reference in describing how the potential imbalance condition of an individual component of propeller shaft assembly 10 can be determined. It should be appreciated that the free body diagram 80 is for explanation purposes only and is not required to determine the imbalance condition of a component as the imbalance condition could be determined, for example, using an algorithm that incorporates the concept of the free body diagram. For each component of propeller shaft assembly 10 identified as having a potential imbalance condition, a longitudinal plane 82 can be drawn though a mass center 84 of the component. The longitudinal plane 82 can be adjusted or shifted at each end 86, 88 by geometric tolerance factors that can affect imbalance including, but not limited to, run-out, centrality, ovality, assembly stack-up tolerances, weld variation tolerances between mating components, mass shift variation, and wall thickness variation. Each of these tolerances can generally be determined from specifications associated with the design and manufacturing of the respective component, such as from process sheets and/or two-dimensional component drawings. For each tolerance condition that is identified as applying to the component, the plane 82 can be adjusted or shifted at a respective end, or both ends 86, 88 where the tolerance would influence the component. Plane 82 can be adjusted by a maximum amount of the applicable tolerance to represent a worst case or maximum out of tolerance condition of the respective component.

Once the applicable tolerance contributions have been applied at each end 86, 88 of the plane 82, an effective amount of shift of mass center 84 from plane 82 to plane 82' can be determined. More specifically, all tolerance conditions that can influence end 86 can be added together to obtain a total amount of shift 90 of plane 82 at end 86. Similarly, all tolerance conditions that can influence end 88 can be added together to obtain a total amount of shift 92 of plane 82 at end 88. If the shift of plane 82 is the same at each end 86, 88, then the effective shift 94 of mass center 84 is equal to the shift at either end 86, 88 of the plane 82. If the shift is different at each end 86, 88 of plane 82, as shown in FIG. 4, then the effective shift 94 can be calculated using the geometrical relationship of the effective shift 94 to the shift distances 90, 92 at each end of plane 82 in connection with the respective distances 96, 98 that establish a position of mass center 84 relative to ends 86, 88. Once the maximum effective shift 94 of the mass center 84 has been determined, a magnitude of an imbalance moment $I_x$ can be determined by taking a mass of the component and multiplying the mass by the determined effective shift 94 to obtain the magnitude of the imbalance moment $I_x$ at the mass center 84.

With the magnitude of imbalance $I_x$ at the mass center 84 of each component being determined, the corresponding contribution to the associated established imbalance planes, i.e., Planes 1-4, can then be determined at step 230. The imbalance contribution to each of Planes 1-4 represents an imbalance condition that can be transmitted to the vehicle or structure that is constraining propeller shaft assembly 10 at Planes 1-4. In general, each component with a determined imbalance condition can have a contribution to a pair of imbalance planes that span or are closest to the component providing the contribution. For example, and with reference to exemplary propeller shaft assembly 10, constant velocity joint 30, stub shaft 26, front tube 20, weld yoke 32, universal joint 38, spline yoke 36 and stub shaft 40 can all have potential imbalance contributions to Planes 1 and 2. Similarly, stub shaft 40, center tube 22, and stub shaft 50 can all have potential imbalance contributions to Planes 2 and 3. Regarding Planes 3 and 4, stub shaft 50, spline yoke 54, universal joint 56, weld yoke 58, rear tube 24, stub shaft 64, and rear constant velocity joint 68 can all have potential imbalance contributions to Planes 3 and 4.

To determine the contribution of the magnitude of imbalance $I_x$ of a component to a pair of imbalance planes, such as Planes 1 and 2, the following equation can be used to calculate a contribution of the imbalance condition to Plane 1:

$$I_{p1} = (I_{x12} * X_1)/A \qquad \text{Equation (1)}$$

where $I_{p1}$ is the imbalance contribution to Plane 1, $I_{x12}$ is the magnitude of the imbalance condition of the component contribution to Planes 1 and 2, $X_1$ is the distance from $I_{x12}$ to Plane 2, and A is the distance between Plane 1 and Plane 2, as generally shown in FIG. 3. While $I_{x12}$ is shown in FIG. 3 as associated with mass center 84 of front tube 20, it should be appreciated that $I_{x12}$ can be associated with any component having an imbalance condition contributing to Planes 1 and 2, such as the components listed above for exemplary propeller shaft assembly 10. Once the imbalance contribution to Plane 1 is determined, the contribution to Plane 2 can be determined using the following equation:

$$I_{p2} = I_{x12} - I_{p1} \qquad \text{Equation (2)}$$

where $I_{p2}$ is the imbalance contribution to Plane 2. The imbalance contributions $I_{p1}$, $I_{p2}$, can be determined for each component listed above that would have a potential contribution to Planes 1 and 2 in an additive fashion to arrive at a total imbalance contribution to Planes 1 and 2 from respective contributing components at step 240.

A similar process can be followed to determine imbalance contributions to Planes 2 and 3 from a potential imbalance condition associated with any one of the exemplary contributing components listed above for Planes 2 and 3. With continued reference to FIG. 3, the following equation can be used to calculate an imbalance contribution to Plane 2:

$$I_{p2} = (I_{x23} * X_2)/B \qquad \text{Equation (3)}$$

where $I_{p2}$ is the imbalance contribution to Plane 2, $I_{x23}$ is the magnitude of the imbalance condition of the component contributing to Planes 2 and 3, $X_2$ is the distance from $I_{x23}$ to Plane 3, and B is the distance between Plane 2 and Plane 3. While $I_{x23}$ is shown in FIG. 3 as associated with mass center 84 of center tube 22, it should be appreciated that $I_{x23}$ can be associated with any component having an imbalance condition contributing to Planes 2 and 3. Once the imbalance contribution to Plane 2 is determined, the contribution to Plane 3 can be determined using the following equation:

$$I_{p3} = I_{x23} - I_{p2} \qquad \text{Equation (4)}$$

where $I_{p3}$ is the imbalance contribution to Plane 3. The imbalance contributions $I_{p2}$, $I_{p3}$, can be determined for each component listed above that would have a potential contribution to Planes 2 and 3 in an additive fashion to arrive at a total imbalance contribution to Planes 2 and 3 from respective contributing components also at step 240.

For Planes 3 and 4, a similar process can again be followed to determine imbalance contributions from a potential imbalance condition associated with any one of the exemplary contributing components listed above for Planes 3 and 4. The following equation can be used to calculate an imbalance contribution to Plane 3:

$$I_{p3} = (I_{x34} * X_3)/C \qquad \text{Equation (5)}$$

where $I_{p3}$ is the imbalance contribution to Plane 3, $I_{x34}$ is the magnitude of the imbalance condition of the component contributing to Planes 3 and 4, $X_3$ is the distance from $I_{x34}$ to Plane 4, and C is the distance between Plane 3 and Plane 4. While $I_{x34}$ is shown in FIG. 3 as associated with mass center 84 of rear tube 24, it should be appreciated that $I_{x34}$ can be associated with any component having an imbalance condition contributing to Planes 3 and 4. Once the imbalance contribution to Plane 3 is determined, the contribution to Plane 4 can be determined using the following equation:

$$I_{p4} = I_{x34} - I_{p3} \qquad \text{Equation (6)}$$

where $I_{p4}$ is the imbalance contribution to Plane 4. The imbalance contributions $I_{p3}$, $I_{p4}$, can be determined for each component listed above that would have a potential contribution to Planes 3 and 4 in an additive fashion to arrive at a total imbalance contribution to Planes 3 and 4 from respective contributing components also at step 240.

With continuing reference to FIG. 3, an example determination of the imbalance contribution of front tube 20 to balancing Planes 1 and 2 will now be discussed. Front tube 20 can have the following geometric tolerance factors that can contribute to an imbalance condition based on the configuration of exemplary propeller shaft assembly 10: stack-up tolerances due to weld variation between front tube 20 and stub shaft 26 of 0.021 cm influencing end 28 of front tube 20, stack-up tolerances due to weld variation between front tube 20 and weld yoke 32 of 0.021 cm influencing end 34 of front tube 20; wall thickness variation of 0.03 cm influencing both ends 28, 34 of front tube 20; and run-out of 0.015 cm also influencing both ends 28, 34 of front tube 20. With reference to free body diagram 80, the shift amount 90 at end 86 is calculated to be 0.039 cm (by adding 0.021 cm+0.015 cm+0.03 cm), and the shift amount 92 at end 88 is similarly calculated to be 0.039 cm. This results in an effective amount of shift 94 of mass center 84 of 0.039 cm. Using an exemplary mass of 1600 grams for front tube 20, the magnitude of imbalance $I_x$ can be calculated to be 62.4 g-cm by multiplying 1600 grams by 0.039 cm.

Using the magnitude of imbalance $I_x$ for front tube 20, the contribution of the magnitude of imbalance $I_x$ to Planes 1 and 2 can be determined with reference to FIG. 3 and Equations (1) and (2). To use Equation (1), the following exemplary dimensions need to be defined: the distance $X_1$ from mass center 84 to Plane 2 of 67 cm; and the distance A from Plane 1 to Plane 2 of 142 cm. With reference to FIG. 3 and noting that $I_{x12}$ represents the magnitude of imbalance of front tube 20 at mass center 84 of 62.4 g-cm for this example calculation, the contribution to Plane 1 is determined using Equation (1) as follows:

$$I_{p1} = (62.4 \text{ g-cm} * 67 \text{ cm})/142 \text{ cm} = 29.4 \text{ g-cm}.$$

The contribution to Plane 2 can then be determined using Equation (2) as follows:

$$I_{p2} = 62.4 \text{ g-cm} - 29.4 \text{ g-cm} = 33 \text{ g-cm}.$$

The imbalance contributions $I_{p1}$, $I_{p2}$, $I_{p3}$, $I_{p4}$ determined at Planes 1-4, can represent a worst case or maximum magnitude of imbalance that can be potentially realized at each Planes 1-4 based on the above equations and calculations that considered the maximum tolerance or stack-up variation for each respective component. Having the maximum or worst case magnitude of imbalance at Planes 1-4, a statistical representation of the magnitudes of imbalance $I_{p1}$, $I_{p2}$, $I_{p3}$, $I_{p4}$ can also be determined at step 250 by factoring in the respective tolerance range or variation associated with each magnitude of imbalance $I_x$ that was calculated for each respective contributing component. Using the tolerance range or variation information, a Monte Carlo simulation can be conducted to determine the statistically representative magnitude of each imbalance contribution $I_x$ of each contributing component to arrive at a statistically representative value of $I_{p1}$, $I_{p2}$, $I_{p3}$, $I_{p4}$.

With the statistically representative value of $I_{p1}$, $I_{p2}$, $I_{p3}$, $I_{p4}$ based on tolerance variation being determined, an additional statistical simulation, such as the Monte Carlo simulation, can be conducted that considers the various potential angular orientations of $I_{p1}$, $I_{p2}$, $I_{p3}$, $I_{p4}$ from 0-360 degrees. This simulation can be conducted using the statistically representative value of $I_{p1}$, $I_{p2}$, $I_{p3}$, $I_{p4}$ determined from the first Monte Carlo simulation to obtain a statistical representative value of the magnitude of imbalance at Planes 1-4 considering both tolerance ranges and angular orientation of the potential imbalance contributions.

Both the statistical representative value and the maximum or worst case value of the imbalance contribution at each attachment point can then be compared to predetermined criteria at step 260 to determine whether the propeller shaft assembly 10 can have acceptable imbalance contributions at each attachment point represented by the imbalance Planes 1-4. For example, a customer, such as a vehicle manufacturer can establish certain imbalance acceptance criteria for each attachment point of the propeller shaft assembly 10 to a vehicle, and the methodology of the present disclosure can be used to determine whether the imbalance contributions at each attachment point will meet the acceptance criteria without physically testing the propeller shaft assembly.

The imbalance contributions $I_{p1}$, $I_{p2}$, $I_{p3}$, $I_{p4}$ determined for each of Planes 1-4 can also be adjusted or corrected at step 270 from balancing Planes 1-4 to a predetermined location on a tube of propeller shaft assembly 10, such as front tube 20, where balancing weights can be placed. For example and with reference to FIG. 5, by adjusting the imbalance contributions $I_{p1}$, $I_{p2}$ from Planes 1 and 2 to predetermined locations 110, 112 on front tube 20, an estimation or prediction of the balance weight needed to counteract the imbalance contributions at Planes 1 and 2 can be determined. The following equation can be used to adjust the imbalance contribution $I_{p2}$ from Plane 2 to predetermined location 112 on front tube 20:

$$I_{p2'} = I_{p2} * (A-Z-Y)/(A-X_1-Z+Y) \qquad \text{Equation (7)}$$

where $I_{p2'}$ is the adjusted imbalance contribution to predetermined location 112, Y is the distance from balancing Plane 2 to predetermined location 112, and Z is the distance from balancing Plane 1 to predetermined location 110. Similarly, the following equation can be used to adjust the imbalance contribution $I_{p1}$ from Plane 1 to predetermined location 110 on front tube 20:

$$I_{p1'} = I_{p1} * (A-Z-Y)/(X_1-Y) \qquad \text{Equation (8)}$$

where $I_{p1'}$ is the adjusted imbalance contribution from Plane 1 to predetermined location 110.

The method of determining an imbalance of a propeller shaft according to the principles of the present disclosure provides an advantageous process of determining both a worst case and a statistically representative value of an imbalance condition on a propeller shaft assembly that could be transmitted to a vehicle at attachment or constraint points specified by a customer or vehicle manufacturer. The method provides for such a determination during an up-front or initial design phase of a propeller shaft assembly without a need to build and test such components on a balancing apparatus. In fact, the method provides the ability to determine an imbalance of the propeller shaft assembly during early phases of a design and development process where physical parts would not typically be available for physical testing on a balancing apparatus to determine an imbalance condition. If, for example, it was determined that a propeller shaft design could have imbalance contributions greater than the specified acceptance criteria, then up-front design change proposals could be evaluated, such as tolerance reductions for certain components, to reduce the imbalance contributions during an initial design phase of the propeller shaft assembly.

In addition, the method according to the principles of the present disclosure could also be used to efficiently evaluate design changes of a production propeller shaft assembly to determine an imbalance condition of the assembly with the proposed design change. Further, the method could also be used in connection with quality control matters in a manufacturing process to, for example, quickly determine if a certain tolerance variation on a component of the propeller shaft assembly would result in an imbalance condition that would be greater or outside the specified acceptance criteria. Such a determination could initially be made without physically building the propeller shaft assembly thereby potentially reducing scrap.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Also, the method steps, processes, and operations described herein are not to be construed as necessarily requiring their performance in the particular order discussed or illustrated, unless specifically identified as an order of performance. It is also to be understood that additional or alternative steps may be employed. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A method for determining an imbalance of a propeller shaft assembly, comprising:

establishing balancing planes relative to certain areas of the propeller shaft assembly;

identifying each component of the propeller shaft assembly that could have a potential imbalance condition due to a tolerance variation;

determining the potential imbalance condition for each identified component;

determining a contribution of each determined potential imbalance condition to a respective pair of the established balancing planes;

determining a total magnitude of imbalance at the respective pair of established balancing planes based on the determined contribution of each potential imbalance condition; and determining a statistically representative value of the determined total magnitude of imbalance at each plane of the respective pair of balancing planes.

2. The method of claim 1, wherein establishing balancing planes comprises:

determining at least two locations of the propeller shaft assembly that are adapted to be coupled to another structure; and establishing balancing planes relative to the determined coupling locations of the propeller shaft assembly.

3. The method of claim 2, further comprising determining an adjusted total magnitude of imbalance for the determined total magnitude of imbalance at the established balancing planes, wherein the adjusted total magnitude of imbalance corresponds to a predetermined location on a tube of the propeller shaft assembly relative to a location of a respective one of the established balancing planes.

4. The method of claim 2, wherein determining a potential imbalance condition of each identified component comprises:

identifying a mass center of each identified component;

determining an amount of shift of the mass center based on a tolerance variation associated with each identified component; and calculating a magnitude of imbalance at the mass center of each identified component as a function of a mass of the component and the determined shift of the mass center due to the tolerance variation.

5. The method of claim 4, wherein determining a contribution of each potential imbalance condition to a respective pair of the established balancing planes comprises:

calculating a contribution of the calculated magnitude of imbalance of each identified component to a first balancing plane of the pair of established balancing planes as a function of a length of each identified component and a distance from the mass center of each identified component to a second balancing plane of the pair of balancing planes; and calculating a contribution of the calculated magnitude of imbalance of each identified component to the second balancing plane as a function of the calculated contribution to the first balancing plane and the calculated magnitude of imbalance of each identified component.

6. The method of claim 4, wherein determining an amount of shift of the mass center based on a tolerance variation of each identified component comprises:

determining each tolerance variation that can contribute to the potential imbalance condition for each identified component;

determining a maximum amount of each determined tolerance variation that can contribute to the potential imbalance condition for each identified component; and determining an effective amount of shift of the mass center for each identified component as a function of the determined maximum amount of each determined tolerance variation for that component.

7. The method of claim 6, wherein determining an effective amount of shift of the mass center comprises:
establishing a longitudinal plane through the mass center of each identified component;
for each identified component, determining a respective end of each end of the component that the determined maximum amount of tolerance variation would influence;
shifting the plane at the respective determined end of the component by the maximum amount of tolerance variation for each determined tolerance variation that can contribute to the potential imbalance condition; and
for each identified component, calculating the amount of shift of the mass center as a function of the distance the longitudinal plane through the mass center is shifted from the mass center, and a distance from the mass center to each respective end of the component.

8. The method of claim 6, wherein determining a statistically representative value comprises conducting a Monte Carlo simulation of the determined contribution of each potential imbalance condition considering a tolerance range associated with the determined maximum amount of tolerance variation.

9. The method of claim 8, wherein determining a statistically representative value further comprises conducting a second Monte Carlo simulation considering the angle of orientation of the statistically representative value of the determined magnitude of imbalance based on the tolerance range.

10. The method of claim 4, wherein the tolerance variation comprises at least one of concentricity, ovality, run-out, assembly stack-up tolerances associated with mating components, wall thickness variation, mass shift tolerances, and weld variation stack-up tolerances between two welded components of the propeller shaft assembly.

11. The method of claim 1, wherein establishing balancing planes relative to certain areas of the propeller shaft assembly comprises establishing balancing planes relative to the propeller shaft assembly at least at a front constant velocity joint, a front bearing assembly, a center bearing assembly and a rear constant velocity joint.

12. The method of claim 11, wherein the established balancing planes include three respective pairs of balancing planes.

13. The method of claim 1, further comprising:
comparing the determined total magnitude of imbalance to a predetermined set of criteria;
adjusting a tolerance range of at least one of each identified component if the determined total magnitude of imbalance does not meet the predetermined set of criteria;
determining a contribution of each potential imbalance condition to the respective pair of the established balancing planes using the adjusted tolerance range of the at least one of each identified component; and
determining a total magnitude of imbalance at the respective pair of established balancing planes based on the determined contributions of each potential imbalance condition using the adjusted tolerance range of the at least one of each identified component.

14. A method for determining an imbalance of a propeller shaft assembly, comprising:
determining at least two locations of the propeller shaft assembly that are adapted to be coupled to another structure;
establishing at least a pair of balancing planes relative to the at least two determined coupling locations of the propeller shaft assembly;
identifying each component of the propeller shaft assembly that could have a potential imbalance condition contributing to the at least a pair of balancing planes;
calculating a magnitude of imbalance of each identified component at its mass center as a function of a mass of the component and a determined shift of the mass center due to a tolerance variation;
calculating a contribution of the determined magnitude of imbalance of each identified component to a first balancing plane of the at least a pair of balancing planes as a function of a length of each identified component and a distance from the mass center of each identified component to a second balancing plane of the at least a pair of balancing planes;
calculating a contribution of the determined magnitude of imbalance of each identified component to the second balancing plane as a function of the calculated contribution to the first balancing plane and the calculated magnitude of imbalance of each identified component;
determining a total magnitude of imbalance at the first and second established balancing planes based on the calculated contributions of the calculated magnitude of imbalance of each identified component;
determining a statistically representative value of the calculated total magnitude of imbalance at the first and second balancing planes; and
comparing the determined statistically representative value to a predetermined set of criteria.

15. The method of claim 14, further comprising:
determining an adjusted total magnitude of imbalance for each determined total magnitude of imbalance at the first and second balancing planes, wherein the adjusted total magnitude of imbalance corresponds to a predetermined location on a tube of the propeller shaft assembly.

16. The method of claim 14, wherein determining at least two locations includes determining at least four locations of a three tube propeller shaft assembly adapted to be coupled to a vehicle; and
wherein establishing at least a pair of balancing planes includes establishing three pairs of balancing planes relative to the determined at least four coupling locations.

17. The method of claim 14, wherein calculating a magnitude of imbalance of each identified component includes:
determining each tolerance variation that can contribute to the potential imbalance condition for each identified component;
determining a maximum amount of each determined tolerance variation that can contribute to the potential imbalance condition for each identified component; and
determining an effective amount of shift of the mass center as a function of the determined maximum amount of determined tolerance variation for each component.

18. The method of claim 17, wherein each tolerance variation includes at least one of concentricity, ovality, run-out, assembly stack-up tolerances associated with mating components, wall thickness variation, mass shift tolerances, and weld variation tolerances between two welded components of the propeller shaft assembly.

19. The method of claim 14, wherein determining a statistically representative value includes conducting a Monte Carlo simulation to determine a statistically representative value of the calculated total magnitude of imbalance at the first and second balancing planes.

* * * * *